(12) United States Patent
Rosales (10) Patent No.: US 11,680,435 B2
(45) Date of Patent: Jun. 20, 2023

(54) SINGLE DRIVE SYSTEM FOR DRIVING MULTIPLE DRIVEN ASSEMBLIES

(71) Applicant: Brose Fahrzeugteile GmbH & Co. Kommanditgesellschaft, Bamberg, Bamberg (DE)

(72) Inventor: David Rosales, Rochester Hills, MI (US)

(73) Assignee: Brose Fahrzeugteile GmbH & Co. Kommanditgesellschaft, Bamberg (DE)

(*) Notice: Subject to any disclaimer, the term of this patent is extended or adjusted under 35 U.S.C. 154(b) by 105 days.

(21) Appl. No.: 16/950,311

(22) Filed: Nov. 17, 2020

(65) Prior Publication Data
US 2022/0154514 A1 May 19, 2022

(51) Int. Cl.
*E05F 15/614* (2015.01)
*B62D 33/027* (2006.01)
*B62D 33/037* (2006.01)

(52) U.S. Cl.
CPC ........ *E05F 15/614* (2015.01); *B62D 33/0273* (2013.01); *B62D 33/037* (2013.01); *E05Y 2201/216* (2013.01); *E05Y 2201/604* (2013.01); *E05Y 2201/71* (2013.01); *E05Y 2900/544* (2013.01)

(58) Field of Classification Search
CPC ............ E05F 15/614; E05Y 2201/216; E05Y 2201/604; E05Y 2900/544; E05B 81/20; E05B 81/14; E05B 53/008; E05B 77/02; E05B 79/20; B62D 33/0273; B62D 33/037

See application file for complete search history.

(56) References Cited

U.S. PATENT DOCUMENTS

| | | | | |
|---|---|---|---|---|
| 4,763,936 A | * | 8/1988 | Rogakos | E05B 81/20 292/216 |
| 5,474,338 A | * | 12/1995 | Buscher | E05B 77/28 292/201 |
| 5,639,130 A | * | 6/1997 | Rogers, Jr. | E05B 81/20 292/201 |
| 6,053,542 A | * | 4/2000 | Ostrowski | E05B 79/20 292/216 |
| 6,125,583 A | * | 10/2000 | Murray | E05F 15/638 49/360 |
| 6,471,259 B1 | * | 10/2002 | Weyerstall | E05B 81/14 292/216 |
| 6,505,867 B1 | * | 1/2003 | Szablewski | E05B 83/30 292/201 |
| 6,550,825 B2 | * | 4/2003 | Ostrowski | E05B 81/20 292/201 |

(Continued)

*Primary Examiner* — Justin B Rephann
(74) *Attorney, Agent, or Firm* — Dickinson Wright PLLC (57) ABSTRACT

A drive system includes a first rotary component configured to be rotated by an actuator, a second rotary component selectively coupled to the first component, and a third rotary component selectively coupled to the first component. A coupling arrangement is configured to, in a first range of angular positions of the first component, couple the first and second components and decouple the first and third components and configured to, in a second range of angular positions of the first component that does not overlap with the first range, couple the first and third components and decouple the first and second components.

5 Claims, 7 Drawing Sheets

(56) References Cited

U.S. PATENT DOCUMENTS

| | | | |
|---|---|---|---|
| 7,029,039 B2* | 4/2006 | Rathmann | E05B 81/14 |
| | | | 292/199 |
| 7,614,670 B2* | 11/2009 | Hayakawa | E05B 81/20 |
| | | | 292/201 |
| 9,810,004 B2* | 11/2017 | Scholz | E05B 81/20 |
| 11,428,031 B2* | 8/2022 | Rosales | E05B 81/16 |
| 2002/0070564 A1* | 6/2002 | Ohta | E05B 81/20 |
| | | | 292/201 |
| 2008/0217928 A1* | 9/2008 | Spurr | E05B 81/20 |
| | | | 292/198 |
| 2008/0224482 A1* | 9/2008 | Gumbo | E05B 81/40 |
| | | | 292/201 |
| 2015/0021934 A1* | 1/2015 | Barmscheidt | E05B 81/90 |
| | | | 292/336.3 |
| 2017/0089116 A1* | 3/2017 | Heiberger | B62D 33/0273 |
| 2019/0249467 A1* | 8/2019 | Patane | E05B 81/14 |

\* cited by examiner

SINGLE DRIVE SYSTEM FOR DRIVING MULTIPLE DRIVEN ASSEMBLIES

TECHNICAL FIELD

The present disclosure relates to drive systems capable of driving multiple driven assemblies with a same actuator.

BACKGROUND

Vehicles may include one or more closures, such as, hatches, doors, tailgates, liftgates. Certain closures may close automatically, e.g. without the assistance of an operator. Vehicles generally include a seal or other type of weather proofing barrier positioned between the closure and the vehicle body to mitigate external elements such as moisture, precipitation, dirt, debris, and noise from entering the interior of the vehicle. The force applied to the closure must be sufficient to overcome pressure associated with the closure, the seal, and the latch.

SUMMARY

According to one embodiment, a drive system includes a rotary actuator and a transmission driven by the actuator. The transmission includes an input, having first and second engagement features, fixedly coupled to the actuator and supported for rotation within the transmission, a first output supported for rotation in the transmission, and a coupler fixedly coupled to the first output and selectively coupled to the input. The coupler is configured to be coupled to the input when the input is in a first range of angular positions and is decoupled from the input when the input is in a second range of angular positions. A second output is selectively coupled to the input. The second output is supported for rotation in the transmission such that the second output is coupled to the input when the input is in the second range of angular positions and is decoupled from the input when the input is in the first range of angular positions.

According to another embodiment, a vehicle-closure system for use with a vehicle closure that is pivotally coupled to a vehicle body includes a latch having a catch and a cinching mechanism having a tension member with a first end connected to the catch and a second end. The closure system further includes an actuator arrangement comprising an actuator attachable to a vehicle closure, a driveshaft connected to the actuator, a body connection configured to fixedly connect to a vehicle body, a cinching member connected to the second end and rotatable to close the catch, and a transmission selectively coupling the driveshaft to the body connection and the cinching member. The transmission couples the driveshaft to the body connection and decouples the driveshaft from the cinching member for a first range of rotation so that rotation of the driveshaft moves the closure towards a closed position without actuating the tension member. The transmission also decouples the driveshaft from the body connection and couples the driveshaft to the cinching member for a second range of rotation so that rotation of the driveshaft actuates the catch closed to fully seat the closure to the vehicle.

According to yet another embodiment, a drive system includes a first rotary component configured to be rotated by an actuator, a second rotary component selectively coupled to the first component, and a third rotary component selectively coupled to the first component. A coupling arrangement is configured to, in a first range of angular positions of the first component, couple the first and second components and decouple the first and third components and configured to, in a second range of angular positions of the first component that does not overlap with the first range, couple the first and third components and decouple the first and second components.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles include many different components that are movable relative to each other. For example, a vehicle includes body and a variety of closures such as doors, tailgates, liftgates, etc. depending on the type of vehicle. One or more of these closures may be automatically opened, closed, or both. A latch is used to secure the closure closed. A seal is typically provided on the body, the closure, or both to seal the cabin from the elements. A closure may be described as having an open position, a partially closed position in which the latch is in contact with a striker of the closure and the closure is resting on the seal, and a fully closed position in which the latch is locked and the seal is compressed. This disclosure presents a drive-system capable of pivoting the vehicle closure to both the partially closed position and the fully closed position as will be described below in more detail.

Vehicles also include seats having, for example, a seat bottom, a seat back, and a head rest. One or more of these components are movable relative to each other. A drive system within the seat may be used to move the seat back relative to the seat bottom, move the head rest relative to the seat back, or both. This disclosure presents also drive-system capable of pivoting both the seat back and the head rest with a single actuator.

Figure 1:
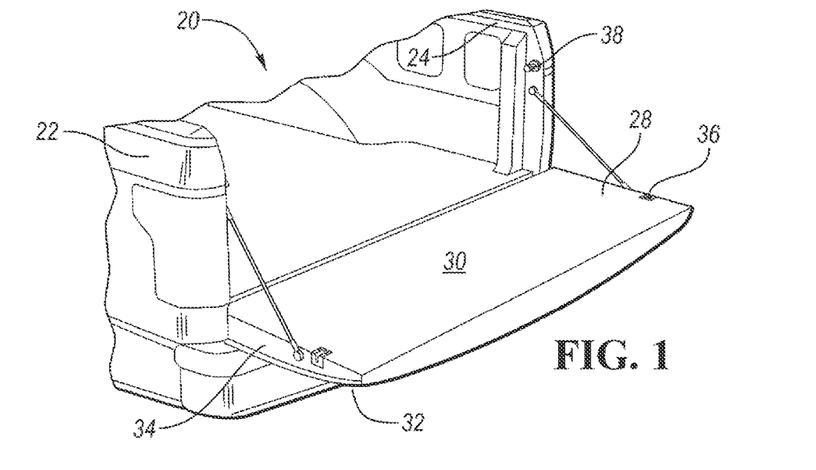
FIG. 1 is a rear perspective view of a portion of a pickup truck.

Referring to FIG. 1, a vehicle 20, such as a pickup truck, includes a body 22 and a closure 28 that is movably attached to the body 22 so that the closure can open and close. The closure may be a tailgate, a door, a hatch, a truck lid, a hood, or the like. In one example, the closure 28 is a tailgate pivotally attached to sidewalls 24 at a rear end of a box. In this embodiment, the tailgate 28 includes an inner panel 30, an outer panel 32, and a pair of lateral sides 34 extending between the inner panel 30 and the outer panel 32. In some embodiments, the lateral sides 34 are integrally formed with the inner panel or the outer panel, and are secured to the other of the inner and outer panels by hemming or by another type of connection. Each of the lateral sides 34 includes a connection feature that is engageable with a corresponding connection feature on one of the sidewalls 24. The tailgate 28 pivots open and a closed along the connection features. Each lateral side 34 may include a latch 36 that cooperates with a corresponding striker 38 connected to one of the sidewalls 24. The latch 36 and the striker 38 secure the tailgate 28 closed. The tailgate 28 also includes a handle operably connected to the latches 36 and configured to disengage the latches 36 from the strikers 38 to open the tailgate 28. The vehicle may also be able to open the latches 36 remotely with the press of a button or the like. The latches 36 may include a lock operable by a key, a button, a key fob, etc. When locked, the tailgate 28 cannot be opened.

As will be described in more detail below, the closure 28 is configured to automatically open and/or close. The closure may include an actuator, such as an electric motor, that pivots the closure between the open and closed positions. The vehicle may include an input, e.g., a button, located within the passenger cabin, on a key fob, etc., that when pressed, commands actuation of the closure.

Figure 2:
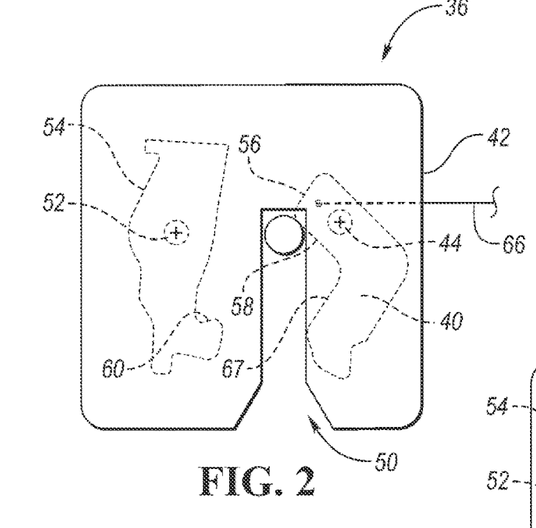
FIG. 2 is a front view of a latch in an unlatched position.
Figure 3:
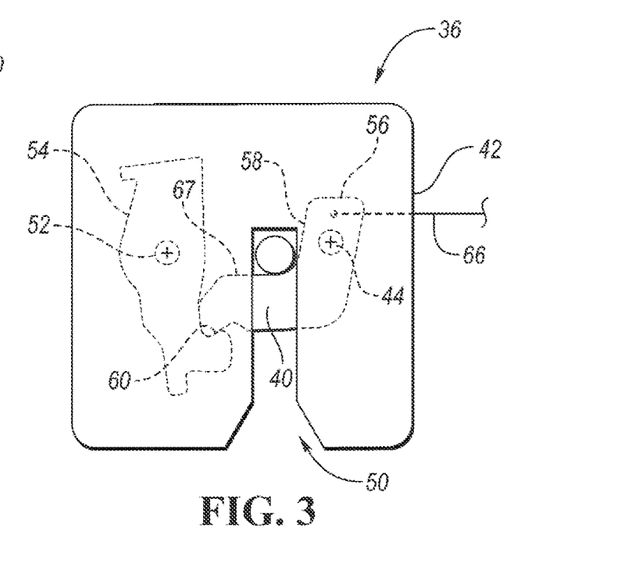
FIG. 3 is a front view of the latch in a latched position.

Referring to FIGS. 2 and 3, the latch 36 may be configured to engage with the striker 38 which may be a bolt, a rod, a loop, or other member configured to engage with a latch. The latch 36 may include a catch 40 disposed within a housing 42 and pivotal about a fastener 44 or the like. The catch 40 may be biased or constrained by a biasing member such as a spring (not shown) that biases an arm 46 of the catch 40 away from the opening 50. The latch 36 may also include a pawl 54 connected to the housing 42 by another fastener 52 that forms a pivot axis for the pawl 54. The pawl 54 is configured to retain the catch 40 in the latched position. A base 56 of the catch 40 defines a surface 58 configured to engage with the striker 38 when the closure 28 is partially closed. As the closure 28 is further closed, the striker 38 pushes on the surface 58 causing the catch 40 to pivot about fastener 44 into engagement with the pawl 54. The pawl includes a surface 60 configured to engage with a surface 62 of the catch 40 to secure the catch 40 in the latched position in which the striker 38 may not be removed from the opening 50. The pawl 54 is rotated, such as by a cable (not shown) to release the latch 36.

As discussed above, the closure 28 may be automatically opened, closed, or both. According to one embodiment, an actuator arrangement is configured to automatically close the tailgate 28 to the truck box 22. The actuator arrangement is configured to pivot the tailgate 28 about an axis extending through the connection features. The actuator arrangement may include an electric motor that pivots the tailgate 28. The electric motor may be unable to fully close the tailgate due to resistance from a seal, the latch mechanism, or other obstacle. Therefore, a two-step process may be employed to automatically close the tailgate 28. In a first step, the electric motor pivots the tailgate 28 until the striker 38 engages with the base 56. In a second step, sometimes called cinching, the catch 40 is rotated to draw the tailgate 28 fully closed. A cinching mechanism may be used to actuate the catch 40. For example, a cable 66 may be used to pivot the catch 40 about the fastener 44. When pivoted, a surface 67 hooks a backside of the striker 38 and pulls the tailgate 28 to the fully seated position and sufficiently rotates the catch 40 so that the surface 62 engages with the surface 60 to close the latch 36.

In many previous designs, the cinching mechanism was powered by a different actuator than the actuator used to rotate the closure. Here, however, the cinching mechanism is powered by the actuator that pivots the tailgate 28. While described as two steps for ease of description, the motor may operate continuously to both rotate the tailgate 28 into engagement with the striker and to cinch the tailgate 28 fully closed. Using a single actuator in the tailgate closure system reduces the need for additional actuators reducing cost and weight.

The following figures and related text describe example closure systems that include a driving system that has a single actuator for both rotation of the closure and for cinching of the closure.

Figure 4:
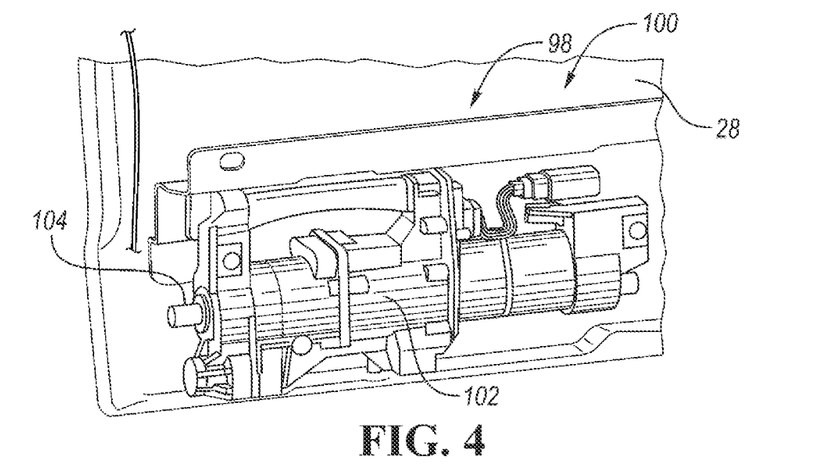
FIG. 4 is a diagrammatical perspective view of an interior of a vehicle closure.

Referring to FIG. 4, the closure system will be described in a tailgate application, but it is to be understood that this is just an example; the closure system may be used in other applications such a door, a rear hatch, a trunk lid, a hood, etc. The closure 28, e.g., a tailgate, includes a drive system 98 for closing the tailgate 28. The drive system 98 includes an actuator arrangement 100 having a rotary actuator, e.g., electric motor 102, housed in the interior of the tailgate 28. The electric motor 102 includes a stator fixed to the tailgate 28, a rotor supported for rotation within the stator, and one or more driveshafts 104 coupled to the rotor. The driveshaft 104 is operably connected to the vehicle via one or more intermediate components (not shown) such as a transmission, a gearing arrangement, or the like. During automatic closing of the tailgate 28, the driveshaft 104 is rotated to pivot the tailgate 28 closed. Once the tailgate is rotated partially closed, a secondary operation, e.g., a cinching operation, fully seats (fully closes) the tailgate 28 to the body 22.

Figure 5:
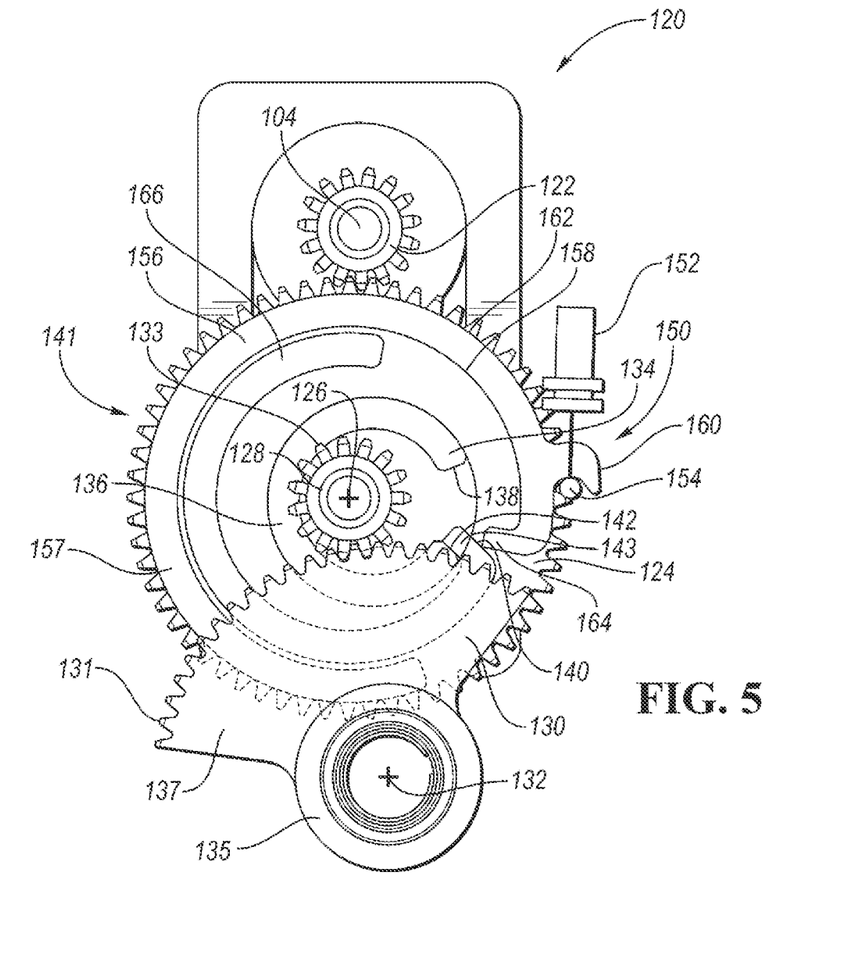
FIG. 5 is a diagrammatical front view of a drive system.

FIG. 5 illustrate one example transmission 120 of the closure system that allows a single actuator to both rotate the closure and cinch the closure. The transmission 120 may include a gearing arrangement, a coupling arrangement, and a cable actuator. The transmission 120 will be described in conjunction with the tailgate embodiment of FIG. 4, but may be used in other applications as described elsewhere herein. The transmission 120 may be disposed within the tailgate 28 adjacent to the motor 102.

The transmission 120 may include a single input and a pair of outputs. One of the outputs (primary output) is operably coupled to the vehicle and is used to pivot the closure. A second of the outputs (secondary output) operates the cinching mechanism. The input is fixedly coupled to the driveshaft 104 and is selectively coupled to the primary and second outputs. A group of rotating elements are fixedly coupled to one another if they are constrained to rotate as a unit in all operating conditions. Rotating elements can be fixedly coupled by spline connections, gear mesh, welding, press fitting, machining from a common solid, or other means. Slight variations in rotational displacement between fixedly coupled elements can occur such as displacement due to lash or shaft compliance. In contrast, two rotating elements are selectively coupled when constrained to rotate as a unit in a first operating condition and are free to rotate at distinct, unrelated speeds in at least some other operating condition. Two elements are coupled if they are either fixedly coupled or selectively coupled.

In one embodiment, a pinion gear 122 may be is fixedly coupled (rotationally fixed) to the driveshaft 104. The pinion gear 122 meshes with an input gear 124 of the transmission that is supported for rotation about an axis 126. The axis 126 is offset from the driveshaft 104. An output gear 128 is also supported for rotation within the transmission 120 and is selectively coupled to the input gear 124. The output gear 128 may be supported for rotation about the axis 126, or alternatively, may be supported for rotation about an axis that is offset from the axis 126. The gear 128 is fixedly coupled to with a body connection 130 that is held stationary relative to the vehicle. The body connection 130 may be within the tailgate 28 but held stationary as the tailgate pivots. A post of the vehicle may be operably coupled to the body connection 130 to hold it stationary. The body connection 130 may include gear teeth 131 that mesh with gear teeth 133 of the gear 128. For example, the body connection 130 may include a sector gear 137 that is either within the transmission or adjacent to the transmission. The sector gear 137 is held stationary and is centered on pivot axis 132 of the tailgate 28. The sector gear 137 includes a hub 135 that is configured to connect with a post of the vehicle either directly or through one or more intermediate components. The hub 135 may be keyed to prevent relative rotation between the sector gear 137 and its support, such as a shaft, a post, etc.

Figure 6A:
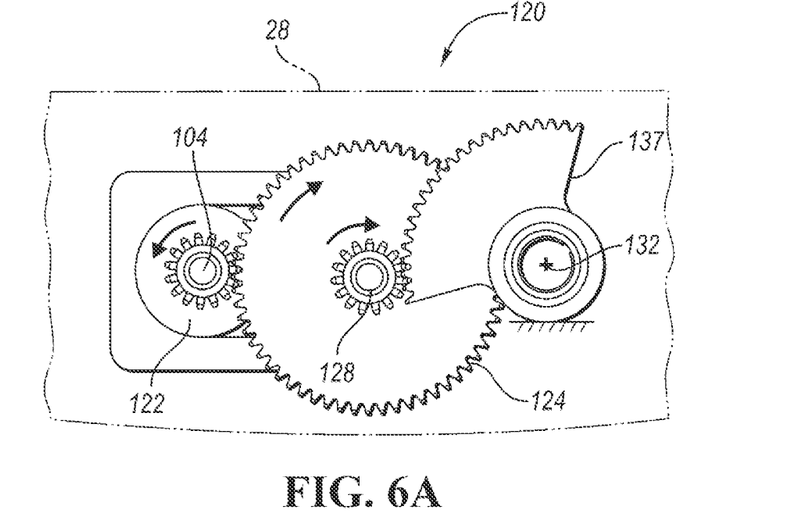
FIG. 6A is a diagrammatical view of the drive system in an open position of the vehicle closure.
Figure 6B:
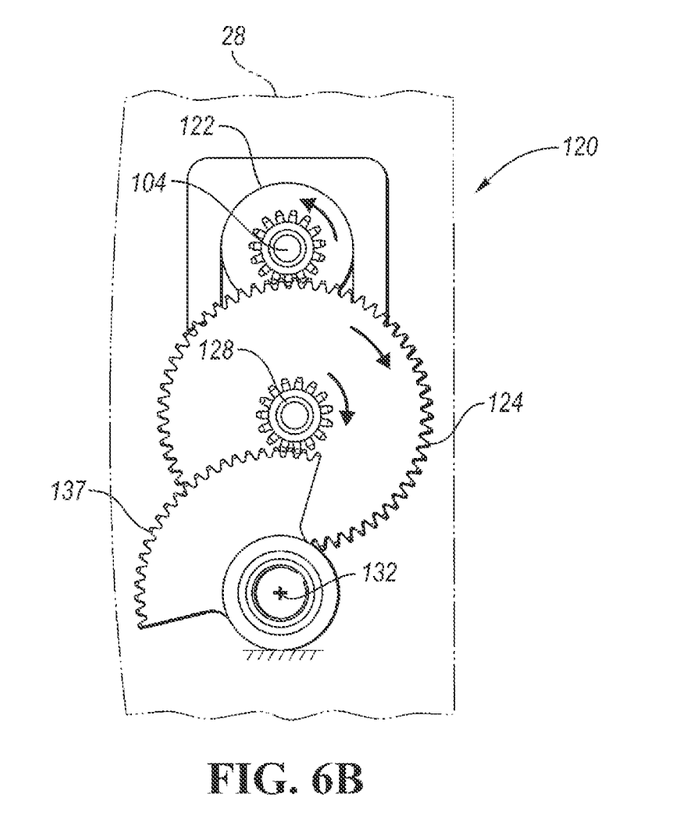
FIG. 6B is a diagrammatical view of the drive system in a closed position of the vehicle closure.

FIGS. 6A and 6B show the transmission 120 (some components are omitted for illustrative purposes) in an open position of the tailgate (FIG. 6A) and a partially closed position of the tailgate (FIG. 6B). The tailgate 28 may be moved from the open position to the partially closed position by rotating the driveshaft 104 in the counterclockwise direction. This rotation is transmitted to the gear 124 through the pinion gear 122, causing the gear 124 to rotate clockwise. When the gear 128 is coupled to the gear 124, rotation of the gear 128 in the clockwise direction causes the tailgate 28 to rotate along the fixed sector gear 137 and pivot about the pivot axis 132 in the clockwise direction as shown in FIG. 6B.

Referring back to FIG. 5, a coupling arrangement 141 is configured to selectively couple the input, e.g., gear 124, to the primary output, e.g., gear 128, and to a secondary output, e.g., a cinching mechanism 150. The coupling arrangement 141 is configured to couple the input to the primary output for a first range of angular positions of the input and to couple the input to the secondary output for a second range of angular positions. The first and second ranges may not overlap so that the input is coupled to one output at a time. In some embodiments, the first and second ranges may be adjacent to each other. That is, the beginning of the second range coincides with the end of the first range. In other embodiments, a short fully decoupled range may be interposed between the first and second ranges.

The coupling arrangement 141 may include a first coupler 134 configured to connect the gears 124 and 128 for a first range of rotation of the gear 124 and is configured to disconnect the gears 124 and 128 for a second range of rotation of the gear 124. The first coupler 134 may be fixedly coupled to the gear 128. The coupler 134 may be integrally formed with the gear 128 or may be a separate component that is attached thereto. In the illustrated embodiment, the coupler 134 is a coupler ring having a ring-shaped body 136 with an open split 138, e.g., C-shaped. The ring-shaped body 136 is supported for rotation about an axis that is offset, i.e., eccentric, relative to the axis 126. In the illustrated view, the coupler ring 136 is shifted to the right relative to the pinion gear 128. The coupler ring 136 may be referred to as an eccentric ring as it is eccentrically mounted relative to the axis 126. The coupler 134 need not be an arcuate body as shown; instead, the coupler 134 may consist of one or more pins, projections, raised areas, hooks, tabs, or any other structure capable of engaging with another component.

The coupling arrangement 141 also includes a second coupler 140 that is fixedly coupled to the gear 124. The second coupler 140 is configured to engage with the first coupler 134 to couple the gears 124 and 128 during the first range of rotation. For example, the second coupler 140 may include a hook 143 (or alternatively, a tab, a pin, a projection, a groove, a recess, or the like) connectable to the first coupler 134. The second coupler 140 may be integrally formed with the gear 124 or may be a separate component that is fixed to the gear. The hook 143 is configured to engage with an end 142 of the C-shaped body 136. When the hook 143 is engaged with the end 142, the pinion gear 128 rotates with the gear 124 and the tailgate 28 pivots about the axis 132 when the driveshaft 104 is rotated by the actuator. Due to the eccentricity, the hook 143 only engages with the coupler ring 136 for a first range of angular positions. Beyond this range, the hook 143 is radially outboard of the coupler ring 136, and rotation of the driveshaft 104 no longer pivots the tailgate 28. The transmission 120 is designed to so that the first coupler 134 is connected to the hook 143 from an open position of the tailgate to a partially closed (not fully seated) position of the tailgate so that the actuator can generally open and close the tailgate 28. The first coupler 134 then releases from the second coupler 140 allowing the actuator 102 to drive the cinching mechanism 150 to fully seat the tailgate 28 and lock the latch 36. While the first coupler 134 is shown as having a fairly large arcuate body, the second coupler 140 may only be a small body such as just the hook 143 or the like.

The cinching mechanism 150 includes a tension member 152, e.g., a Bowden cable, having a first end connected to the latch 36 and a second end 154 connected to the secondary output 156 of the transmission 120. The secondary output 156 may include a cinching ring 157. The cinching ring 157 may be supported for rotation about the axis 126, i.e., the cinching ring 157 is concentric with the gear 124. The cinching ring 157 may also be an open ring. The cinching ring 157 may include a projection 164 extending radially inward from an inner diameter 158 and a connector 160 on the outer diameter 162. The connector 160 is configured to connect with the end 154 of the tension member 152.

The coupling arrangement 141 includes an engagement feature 166 (sometimes referred to as a third coupler) configured to connect the input gear 124 to the cinching mechanism 150. The engagement feature 166 may be fixedly coupled to the gear 124. The engagement feature 166 is configured to engage with the projection 164 to couple the input gear 124 to the secondary output 156. The engagement feature 166 is located on the gear 124 such that the engagement feature 166 does not engage the cinching ring 157 until the coupler ring 136 disengages with the hook 143. That is, the transmission 120 is designed so that for the first range of angular positions, the gear 124 is coupled to the gear 128 and is decoupled from the cinching ring 157, and for the second range of angular positions the gear 124 is de-coupled from the gear 128 and is coupled to the cinching ring 157. This allows a single actuator, e.g., motor 102, to independently operate two driven components, e.g., the first and second outputs. The engagement feature 166 may be a raised portion of the gear 124, or alternatively, may be a separate component that is attached to the gear 124. For example, the engagement feature 166 may be a pin, the end of an arcuate body, or the like. In the illustrated embodiment, the second coupler 140 is an arcuate body that includes both the hook 143 and the engagement feature 166. In other embodiments, these may be separate features.

Figure 7A:
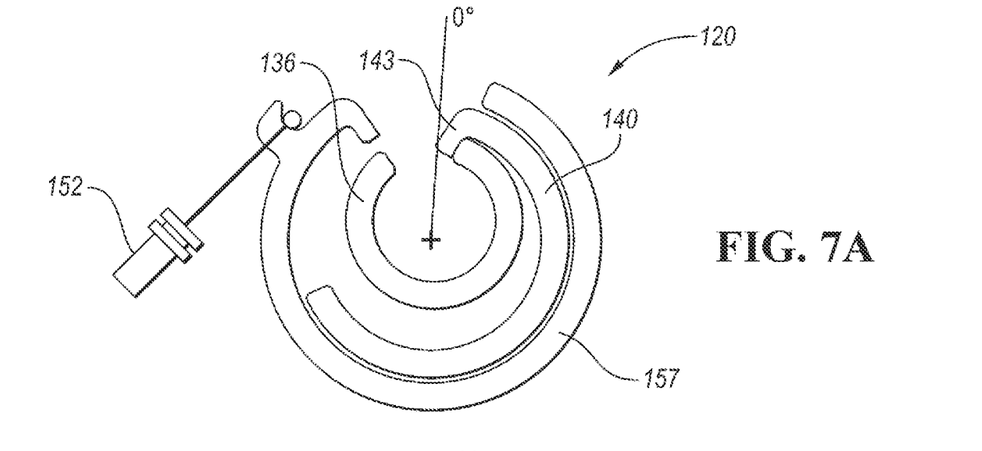
FIGS. 7A through 7F show various positions of a coupler coupling arrangement of a drive system during automatic opening and closing of a vehicle closure.
Figure 7B:
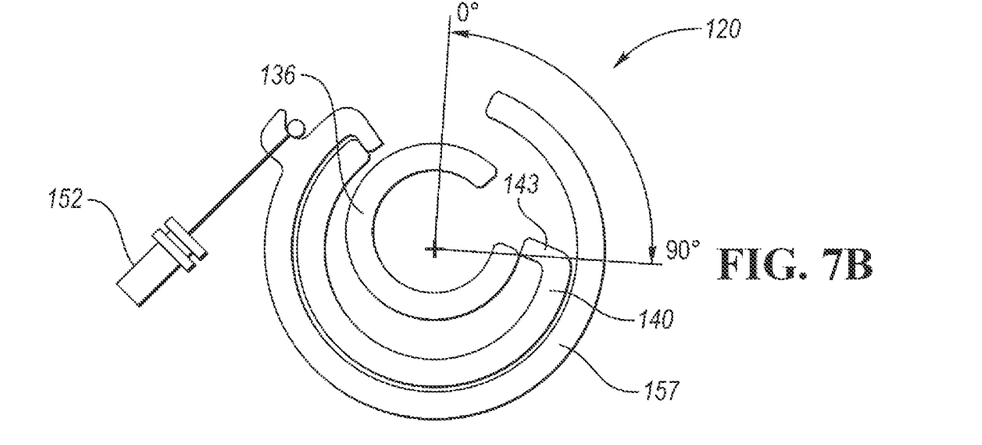
Figure 7C:
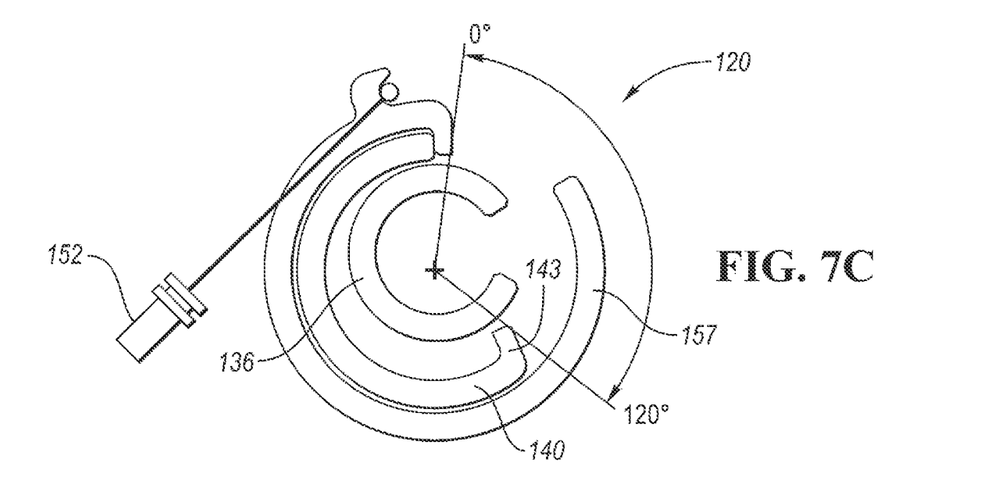
Figure 7D:
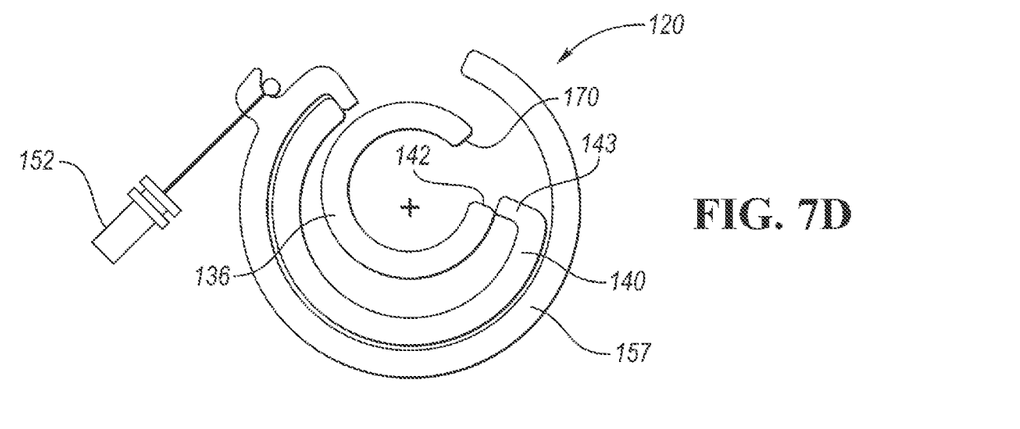

FIGS. 7A through 7D illustrate some components of the transmission 120 during a closing sequence. In FIG. 7A, the tailgate 28 is in the fully open position. In this position, the gear 124 (not shown) and the hook 143 may be at the zero-degree position (this is arbitrary and is used for descriptive purposes). The tailgate 28 is moved from position FIG. 7A to the position of FIG. 7B by rotating the gear 124 in the clockwise direction. The second coupler 140, which is fixed to the gear 124, rotates in unison and transmits that movement to the coupler ring 136 and the gear 128 (not shown). In FIG. 7B, the tailgate is partially closed with the striker disposed against the catch of the latch 36. The gear 124 may be rotated approximate 90 degrees in the tailgate embodiment, but this may vary. In other applications, the gear 124 may be rotated more or less than 90 degrees depending upon the swing angle of the closure. After rotating 90 degrees (or other angular amount), the hook 143 has become radially outboard of the coupler ring 136, thus decoupling the driveshaft 104 from the sector gear 137, and the tension member 152 is now taught the cinching ring 157. Additional rotation of the driveshaft 104 beyond this point, no longer results in rotation of the gear 128. Instead, additional rotation of the input gear 124 pulls the tension member 152 as shown in FIG. 7C. The input gear 124 may rotate an additional 30 degrees, for example, to fully clinch the tailgate 28. Pulling the tension member 152 rotates the catch of the latch 36 to draw the tailgate 28 to a fully seated position and secure the latch 36 as described above. After clinching, the input gear 124 may be rotated backwards to place the hook 143 into a rotational path of the coupler ring 136, e.g., the 90-degree position.

Figure 7E:
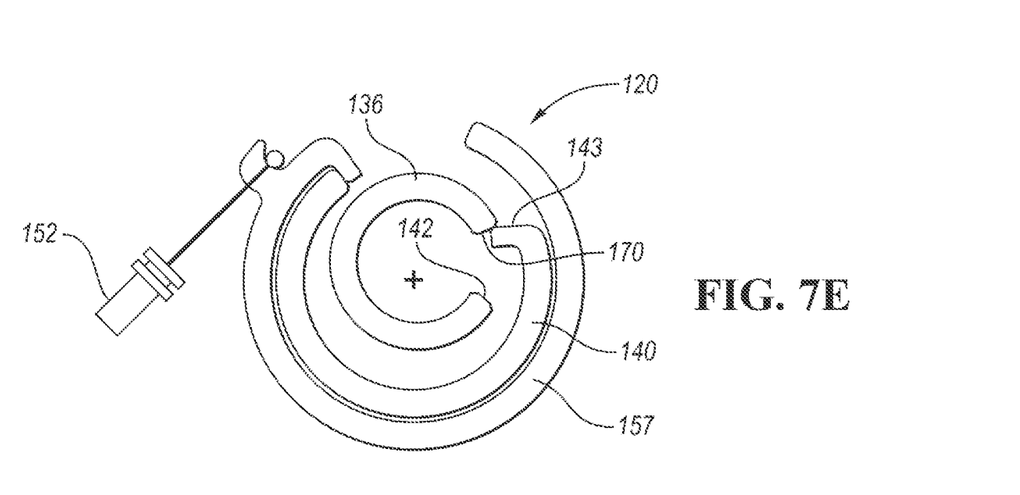
Figure 7F:
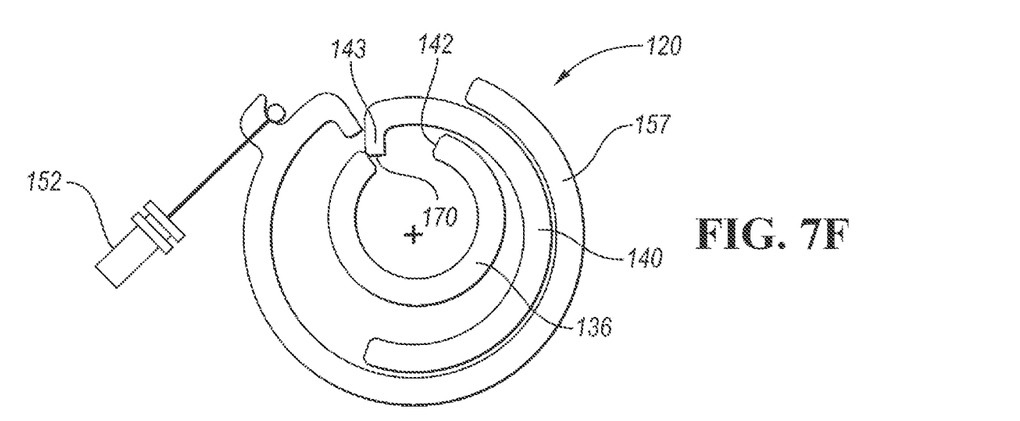

FIGS. 7E through 7F illustrate some components of the transmission 120 during an opening sequence. The tailgate 28 is opened by rotating the gear 124 in the counterclockwise direction to engage the hook 143 with a second end 170 of the coupler ring 136. Rotation of the coupler ring 136 in the counterclockwise direction causes the tailgate 28 to pivot towards the open position. The coupler ring 136 is rotated counterclockwise until it reaches the position shown in FIG. 7F, which corresponds to the tailgate being fully open. Note, the hook 143 may be rotated past the zero-position due to the gap between the ends 142 and 170. At closing, the main link (which drives the gate to close) hands over the closing to the cinching mechanism.

FIGS. 8A through 8D illustrate an alternative embodiment in which the coupler arrangement is concentric. The coupler arrangement 200 may be used in a transmission, such as transmission 120, or any other application in which it is desirable to drive a pair of outputs with a single input. The coupler arrangement 200 includes a first component 202 that is fixedly coupled to an actuator, e.g., an electric motor 102. The first component 202 may be fixedly coupled to the actuator through a series of gears, pulleys, shafts, or the like. For example, the first component 202 may be fixedly coupled to an input gear, such as input gear 124. In some embodiments, the first component 202 may be an integrally formed portion of a gear. The first component 202 may include an arcuate body 204 such as the shown split ring.

The coupler arrangement 200 further includes a second component 208 that is fixedly coupled to a primary output. The second component 208 may be fixedly coupled to a gear, such as gear 128. In some embodiments, the second component 208 may be integrally formed with the gear. The second component 208 may include an arcuate body having a first end 210 and a second end 212. When used in a closure, rotation of the second component 208 may cause the closure to open and close.

A cable actuator 214 is selectively coupled to the first component 202. The cable actuator 214 includes a connector 216 that connects to an end of a cable 218. The cable actuator 214 is supported for rotation such that the cable 218 may be tensioned and released by rotating the cable actuator 214. The cable actuator 214 may include an arcuate body as shown. The cable actuator 214, the first component 202, and the second component 208 may be supported for rotation about a common axis 217. In the illustrated embodiment, the component 202 is the inner most component, followed by the second component 208 and finally the cable actuator 214. These relative positions may be different in other embodiments.

A coupler arm 206 selectively couples the component 202 to the component 208 and the cable actuator 214. The coupler arm 206 may be pivotally attached to the arcuate body 204 and movable between a first position in which a tip 216 of the arm 206 engages with the second component 208 and a second position in which the tip 216 engages with the cable actuator 214. In the first position, the tip 216 is radially inboard to engage with the second component 208, and in the second position, the tip 216 is moved radially outboard to no longer align with the second component 208 and instead align with the cable actuator 214. The coupler arm 206 includes an associated stopper 222 configured to engage with a tab 220 to rotate the arm 206 between the first and second positions. The stopper 222 is stationary within the assembly. As the arm 206 rotates past the stopper 222, the tab 220 engages the stopper 222 causing the arm 206 to pivot from the first position to the second position.

The coupler arrangement 200 may be used in a closure system such as an automatic tailgate. The coupler arrangement 200 is designed to couple the component 202 to the component 208, for a first range of angular positions, in order to rotate the tailgate from the open position to the closed position, and to couple the component 204 to the cable actuator 214, for a second range of angular positions, in order to cinch the cable 218 and fully seat the tailgate 28.

Figure 8A:
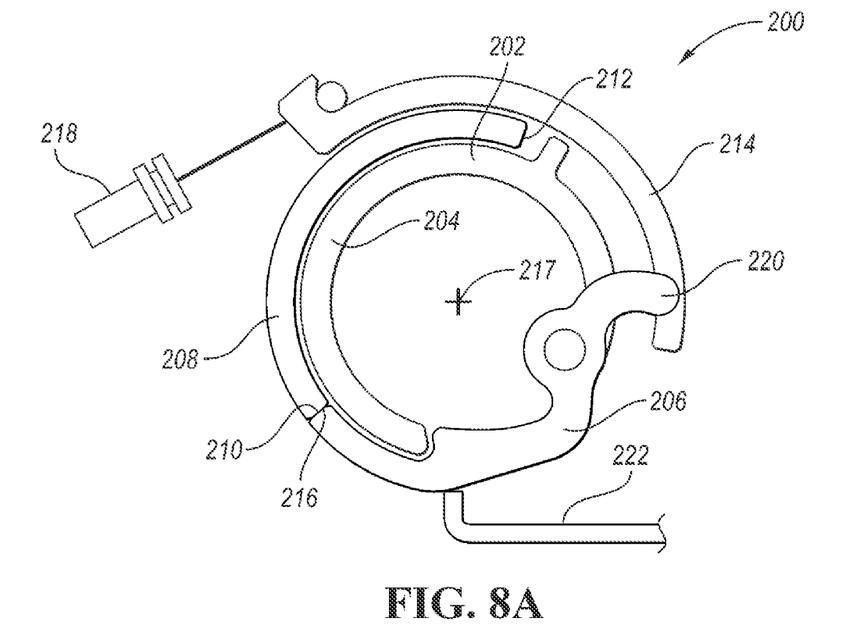
FIGS. 8A through 8D show various positions of a coupler coupling arrangement, according to an alternative embodiment, of a drive system during automatic opening of a vehicle closure.

FIG. 8A illustrates the closure in the fully open position with the first component 202 at an angular position of zero, which is the beginning point of the first range of angular positions. The closure may be closed by rotating the first component 202 in the clockwise direction. Since the arm 206 is in the first position, the second component 208 is coupled to the first component 202 and rotates in unison in the clockwise direction causing the closure to rotate closed.

Figure 8B:
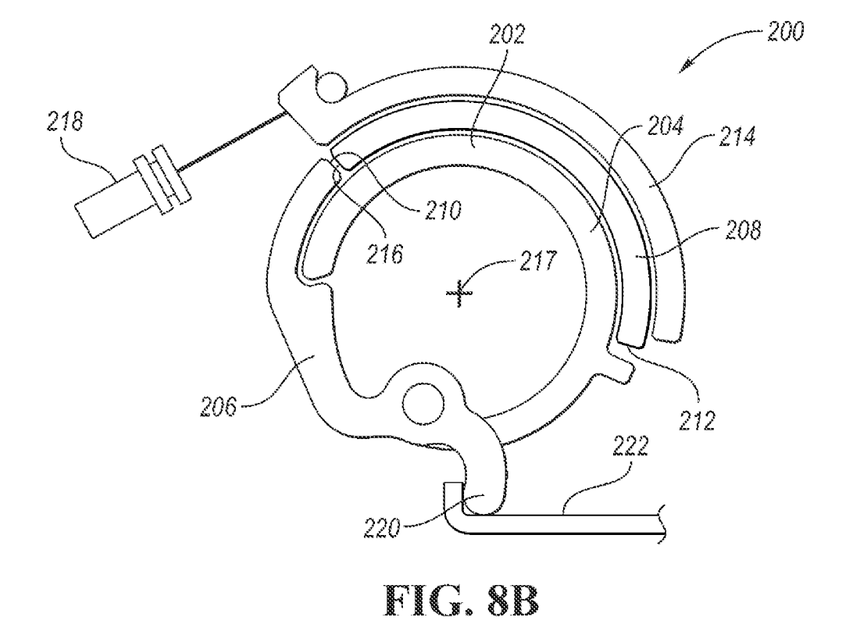
Figure 8C:
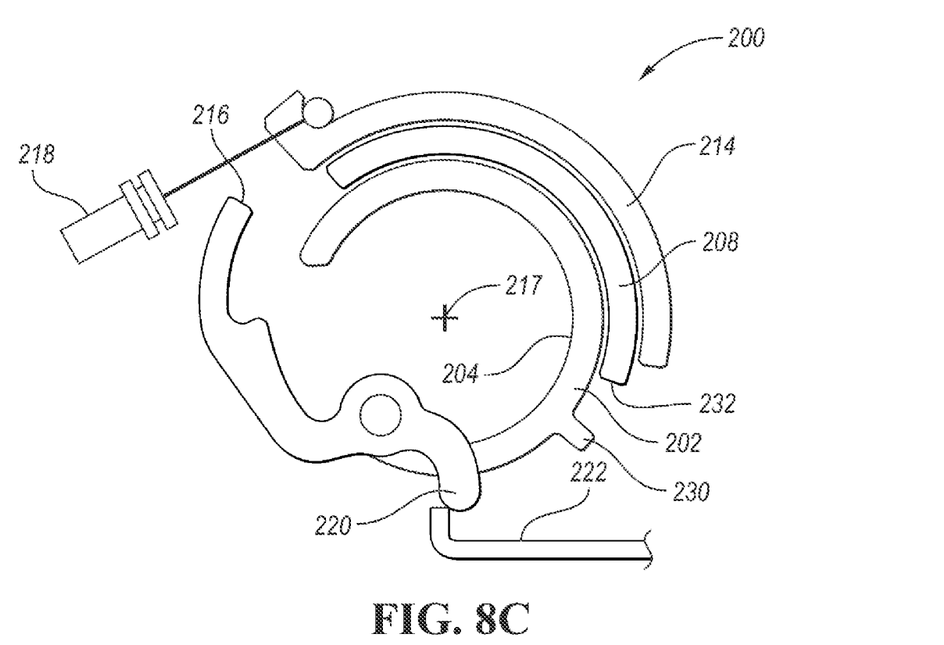
Figure 8D:
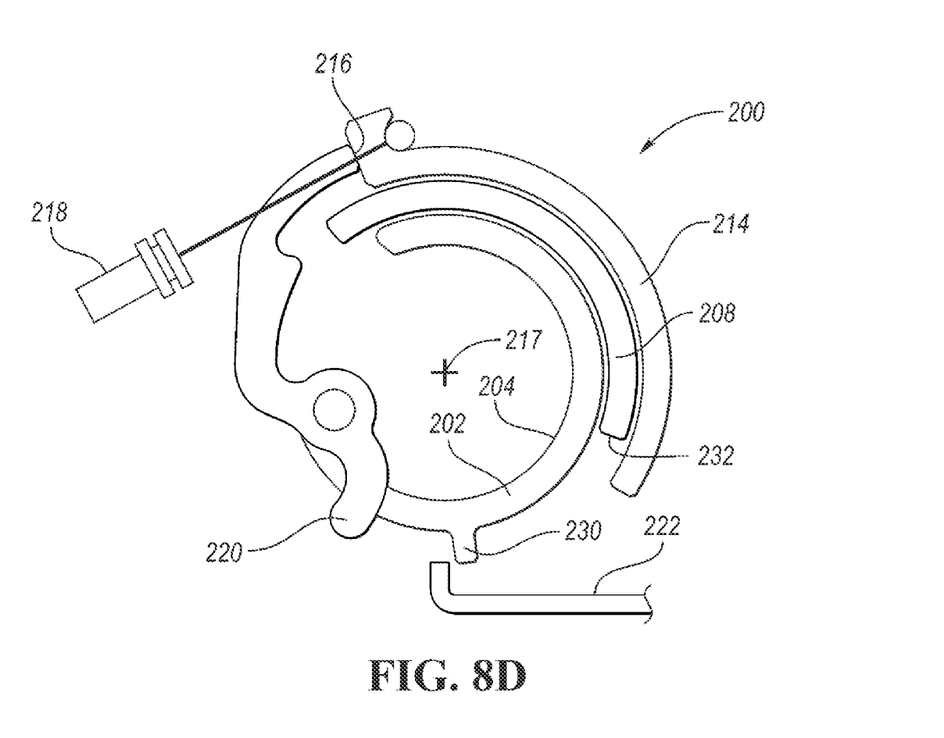

FIG. 8B illustrates the closure in the closed, but not fully seated position. The first component 202 has rotated, approximately 80° in the illustration, to the end of the first range of angular positions. The arm 206 is still connected to the second component 208, and the tab 220 of the arm 206 is adjacent to the stopper 222. Further rotation of the first component 202 causes the arm 206 to disengage with the component 208 and swing to the second position. The coupler arrangement 200 includes a third range of rotation in which the component 202 is disconnected from both outputs. This range of rotation is relatively small and is provided to allow the arm 206 to swing to the second position as shown in FIG. 8C. Engagement of the tip 216 of the arm 206 with the cable actuator 214 marks the beginning of the second range of rotations. Continued rotation of the component 202 rotates the cable actuator 214 to cinch the cable 218 and fully seat the closure.

The coupler arrangement 200 may also be used to automatically open the closure. The component 202 includes a tab 230 configured to engage with an end 232 of the component 208. Rotation of the component 202 in the counterclockwise direction places the tab 230 in contact with the end 232 to rotate the component 208 in the clockwise direction and opened the closure.

While the drive system is exampled mostly in the context of vehicle closures, it can be used in other applications. For example, the drive system may be used in a vehicle seat. The primary output may be driven to pivot the seat back relative to the seat bottom, and the secondary output may be driven to pivot the headrest relative to the seat back.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior at implementations with respect to one or more characteristics, these embodiments are not outside the scope of the disclosure and can be desirable for particular applications.

What is claimed is:

1. A vehicle-closure system for use with a vehicle closure that is pivotally coupled to a vehicle body, the vehicle-closure system comprising:
    a latch including a catch;
    a cinching mechanism including a tension member having a first end connected to the catch and a second end; and
    an actuator arrangement including:
        an actuator attachable to the vehicle closure and including a driveshaft, a body connection configured to fixedly connect to a vehicle body,
        a cinching member connected to the second end and rotatable to close the catch, and
    a transmission selectively coupling the driveshaft to the body connection and the cinching member, wherein the transmission couples the driveshaft to the body connection and decouples the driveshaft from the cinching member for a first range of rotation of the transmission so that rotation of the driveshaft moves the closure towards a closed position without actuating the tension member, and wherein the transmission decouples the driveshaft from the body connection and couples the driveshaft to the cinching member for a second range of rotation of the transmission so that rotation of the driveshaft actuates the catch closed to fully seat the closure to the vehicle.

2. The vehicle-closure system of claim 1, wherein the transmission includes a first gear fixedly coupled to the driveshaft, a second gear fixedly coupled to the body connection, and a coupler supported for rotation within the transmission, wherein the coupler is configured to couple the first and second gears during the first range of rotation and decouple the first and second gears during the second range of rotation.

3. The vehicle-closure system of claim 2, wherein the transmission further includes an engagement feature that is fixedly coupled to the second gear, and wherein the coupler includes an arm fixedly coupled to first gear and pivotally between a first position in which the arm is connected to the engagement feature and a second position in which the arm is connected to the cinching member, wherein the arm is configured to be in the first position during the first range of rotation and in the second position during the second range of rotation.

4. The vehicle-closure system of claim 3, wherein the arm includes a tab configured to engage with a stopper that is rotationally fixed in the transmission, wherein the arm and the tab are arranged such that the stopper engages the arm at an end of the first range of rotation to pivot the arm from the first position to the second position.

5. The vehicle-closure system of claim 1, wherein the body connection includes gear teeth configured to mesh with a gear of the transmission.

* * * * *